March 28, 1967 E. KITTL ETAL 3,311,805
ASYMMETRICAL LOW VOLTAGE CONVERTER
Filed Nov. 2, 1964

INVENTORS
EMIL KITTL &
WILLIAM L. DUDLEY.
BY
Julian C. Keppler
ATTORNEY.

United States Patent Office 3,311,805
Patented Mar. 28, 1967

3,311,805
ASYMMETRICAL LOW VOLTAGE CONVERTER
Emil Kittl, Oceanport, and William L. Dudley, Shrewsbury, N.J., assignors to the United States of America as represented by the Secretary of the Army
Filed Nov. 2, 1964, Ser. No. 408,436
8 Claims. (Cl. 321—2)

The invention described herein may be manufactured and used by or for the Government for governmental purposes, without the payment of any royalty thereon.

This invention relates to voltage converters and particularly to devices for converting a low-voltage source of D.-C. to a higher voltage D.-C. supply.

The means commonly employed for converting D.-C. from a low voltage to a high voltage include electromechanical generators, which are relatively heavy and inefficient, and electronic means. Of the latter, the series connection of separate sources of voltage appears to be the simplest; however, the cost of each separate source of voltage is almost the same for either low or high power output, and the multiplication of sources of voltage multiplies the cost of a converter without necessarily increasing the available power output. Also, the physical mounting of a plurality of sources of voltage may become difficult.

The same disadvantages apply to the use of several sources of voltage, or thermionic diodes, connected in series to supply one of the conventional D.-C. to D.-C. converters. Some of the conventional D.-C. to D.-C. converters use a push-pull scheme that switches two separate sources of voltage alternately between conducting and non-conducting states. The separate sources are connected to opposing ends of a transformer primary winding to provide an alternating current square wave in the transformer. The alternating current is then stepped-up by transformer action, rectified, and filtered in a conventional manner.

In order for the push-pull scheme to be practical, the sources must have high efficiencies at full conduction and low current drain when non-conducting.

Circuits using single sources of voltage are known but these operate on resonance as produced, for example, by the combination of an autotransformer and a capacity to generate a fly-back voltage similar to that found in television high-voltage supplies. These are inherently very inefficient and, while capable of producing very high voltages, can only provide a relatively low power output.

It is therefore an object of this invention to provide an improved D.-C. to D.-C. converter that requires only a single power source.

It is a further object of this invention to provide an improved D.-C. to D.-C. converter for a single power source that functions with an asymmetrical waveform, and produces an efficient and economical voltage conversion.

These and other objects are accomplished by connecting a single source of voltage through a switching transistor to a primary winding of a transformer. The output of a secondary winding of the transformer is rectified and filtered to supply an output load, and also to supply energy, through another switching transistor, to another winding of the transformer to reset the transformer core.

Additional windings of the transformer supply control signals—of opposite polarity—to switch on and off the transistor controlling the source of voltage and the transistor controlling the reset voltage at alternate times.

This invention will be better understood and other objects of this invention will become apparent from the following specification and drawings, of which:

Figure 1:
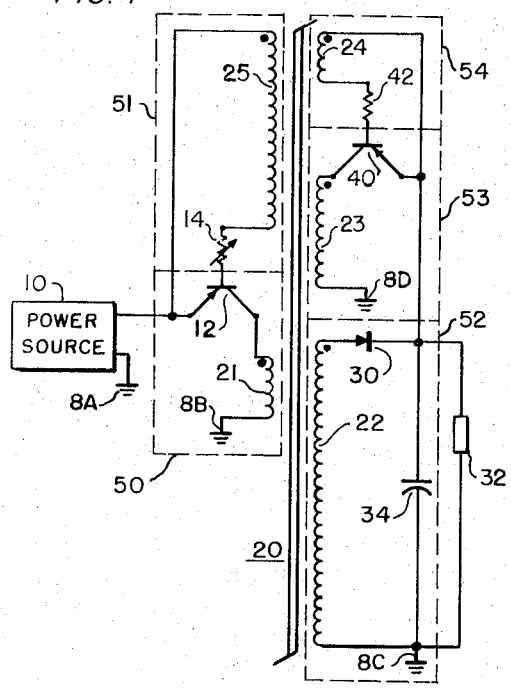
FIG. 1 is a circuit diagram of a typical embodiment of this invention.

Referring now more particularly to FIG. 1, a power source 10 is connected, through a switching transistor 12 and the ground connections 8A and 8B, to the primary winding 21 of the transformer 20. The secondary winding 22 connects through the rectifying diode 30 across the load 32 and the filter capacitor 34.

The capacitor 34 is also connected through another switching transistor 40 and the ground terminals 8C and 8D to the winding 23 of the transformer 20. The emitter-base circuit of the transistor 40 is connected through the resistor 42 to the winding 24 of the transformer 20.

The emitter-base circuit of the transistor 12 is connected through the variable resistor 14 to the winding 25 of the transformer 20.

In operation, the power source 10 provides a source of voltage that is coupled to the transformer primary winding 21 through the switching transistor 12 which connects and disconnects the power source from the primary winding by being driven alternately to saturation and to cutoff. The switching of the transistor 12 between saturation and cutoff is controlled by the voltage induced in the winding 25 which is connected to the emitter-base circuit of the transistor.

The transistor 12 is held in a saturated conducting state due to the voltage induced in the winding 25 of the transformer 20 by the current flowing in winding 21 when the transistor 12 is conducting. When the transformer core reaches saturation, this control voltage of winding 25 drops and reverses to cut off the switching transistor. Simultaneously the voltage, which was induced in winding 24 by the current in winding 21, and which was holding the reset switching transistor 40 in a cut-off condition, drops and reverses to actuate transistor 40 which connects the reset current circuit through the winding 23. The flow of reset current in winding 23 completes the reversal of voltage in windings 25 and 24 to hold the switching transistor 12 in a cut-off state, and the transistor 40 in a conducting state, until the transformer core is again saturated (in the opposite sense) which caused the control voltage in winding 24 to drop and reverse, which cuts off the reset current in winding 23 which also terminates the reversed voltage in winding 25. This restores the original control voltage in winding 25 to switch the transistor 12 back to the conducting state which reconnects the power supply 10 to the transformer winding 21 and completes the cycle.

During the conducting interval of the transistor 12, a voltage is induced across the secondary winding 22. This voltage is stepped-up to a value very much higher than that of the power source and it is rectified by the half wave rectifier 30 to be applied across the load 32 and across the filter capacitor 34. The diode prevents the reversal of voltage across the load, and the capacitor filters the pulsing D.-C. and stores it to supply the load 32 in a well-known manner.

In addition to supplying energy to the load, the filter capacitor 34 stores energy, during the non-conducting interval of the power source circuit, to supply the reset current, which is switched through winding 23 by the transistor 40 as noted earlier.

The reset time establishes the non-conducting interval. This is substantially shorter than the conducting interval of the power source circuit because the voltage is very much higher at the output, across capacitor 34, than it is at the input, across the power source. The higher voltage, switched into the reset circuit by transistor 40, produces more current more quickly than the low voltage of the input circuit. This quickly saturates the transformer core in the opposite direction to reset it. The reset time is also controlled by the separate winding on the transformer. This is independent of the output, and the control is provided by variation of the turns ratio. The reset time may also be controlled by varying the components that establish the switching time of the transistor.

Figure 3:
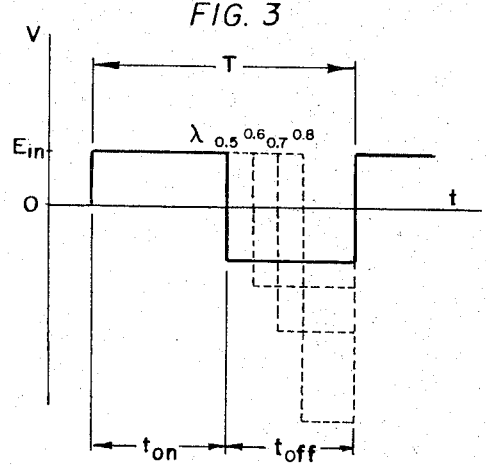
FIG. 3 is a graph of various voltage-time waveforms of the transformer voltage for certain duty cycles of the switched source of voltage.

FIG. 3 shows the relative voltages of the power-source conducting interval and the reset interval as well as the resultant, relative intervals of time for the two functions.

The longer conducting intervals of the power source provide longer applications of voltage, through the rectifier 30 to the load and to the storage capacitor 34. This provides longer intervals of charge of the capacitor and shorter intervals during which the capacitor has to supply both the load and the reset current. The longer the ratio of the conducting interval of the power supply to the reset current interval, the longer the duty cycle and the greater the efficiency.

Figure 4:
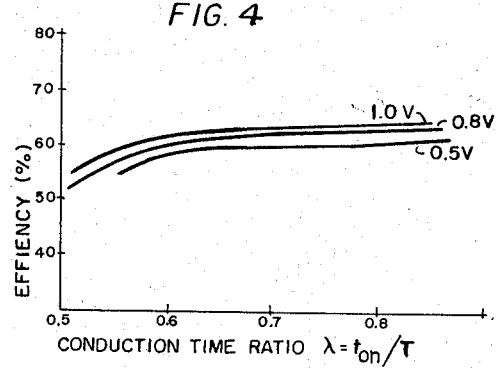
FIG. 4 is a graph of the output efficiency of this circuit with respect to duty cycle for various input voltages.

FIG. 4 shows the efficiency of this converter with respect to conduction time ratios for typical voltages of the power-source input. It is seen that the greater the ratio of the conduction time of the power source to the reset time the greater the efficiency.

However, the reset time cannot be reduced below a practical value that is established by the voltage ratings of the circuit components, and the core losses, which increase as the switching time decreases. The reset time, in turn, limits the maximum, practical, conduction-time ratio. Another factor that limits the conduction time ratio is the switching times for the transistors, as well as for the thermionic diodes, between ignited and unignited modes, when they are used as power sources. These switching times become more significant as the conduction time ratio increases, or as the frequency of the complete cycle increases.

Other factors effecting the efficiency of the circuit are the internal losses of the transistors, the transistor drive circuit losses, the switching losses, the $I^2R$ losses, and the rectifier losses. Rectifier losses can be reduced by substituting a driven germanium transistor for the rectifier. The driven germanium transistor has about half the forward voltage drop of the fast-switching, silicon diode that would normally be used here.

Figure 2:
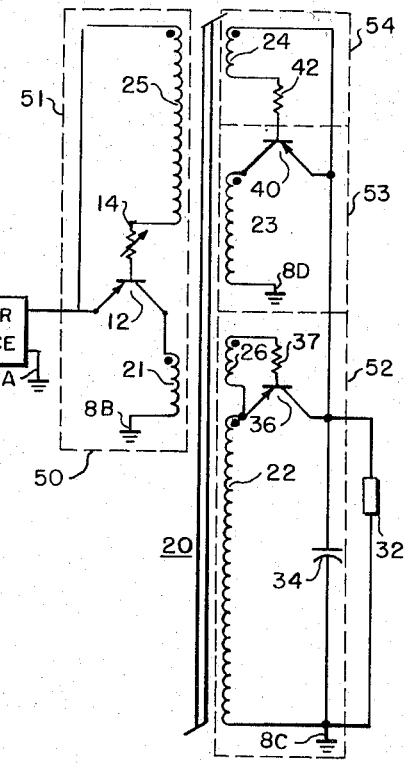
FIG. 2 is a circuit diagram of another embodiment of this invention.

FIG. 2 shows a typical circuit using a driven germanium transistor in place of the diode rectifier 30. In this circuit the transistor 36 is provided with control circuits similar to those used for the other two switching transistors. The transformer 20 is provided with another winding 26, which is connected in series with the resistor 37 across the emitter-base, input, control circuit of the transistor 36. The control winding 26 is so oriented that it applies the voltage necessary to turn on the transistor 36 at the same time and in the same manner as the winding 25 applies the voltage to turn on the switching transistor 12. Thus, the transistor 36 is made to conduct in a forward direction at the same time as the transistor 12 is made to conduct current from the power source to the transformer input winding 21. The voltage from the secondary, winding 22 is thereby applied to the load and to the capacitor 34 in the proper polarity to build up the voltage and store the D.-C. to supply the load and the reset current in the same manner as with the diode rectifier. The functions are further blocked off by the dotted lines forming the boxes 50, for the input switching function; 51 for the control circuit for the input switching function; 52 for the output rectifying function; 53 for the reset switching function; and 54 for the control circuit for the reset switching function.

The practical limit of voltage step-up for this converter is also limited by the optimum impedance matching of the load. A higher turns ratio would produce a higher output impedance and require a higher load impedance for maximum efficiency. Higher output and load impedances usually imply higher internal losses and a decrease in the amount of current that can be applied to the load.

It will be obvious to one skilled in the art that the various turns ratios and other parameters of this circuit can be varied to produce optimum conditions of voltage, current, frequency of operation, or overall efficiency, as desired.

In a typical circuit made in accordance with this invention, the transistors 12, 40, and 36 were Honeywell ES-44, 2N1421 and 2N1100 types respectively; the diode 30 was a Hughes types RS 2040, fast-switching, silicon diode; the resistors 14, 42, and 37 were 1 ohm, 33 ohms, and 33 ohms respectively; and the capacitor 34 was 4,000 microfarads. The transformer 20 had a Supermalloy core #5320–S1 with windings 21, 22, 23, 24, 25, and 26 of 5, 160, 12, 4, 5, and 5 turns respectively.

In a D.-C. conversion from .5 volt to 12 volts, output powers ranging from 2 watts to 14 watts were obtained at efficiencies between 55 and 67 percent at an operating frequency of 4000 cycles per second.

What is claimed is:
1. A low voltage converter comprising:
a source of direct current;
a transformer having an input winding, an output winding, and a reset winding;
a first switching means for connecting said source of direct current to said input winding, during a first time interval;
an output load;
a storage capacitor connected across said output load;
rectifying means connecting said output winding to said output load; and
a second switching means for connecting said storage capacitor to said reset winding during a second time interval substantially shorter than said first time interval,
said first and second time intervals comprising one cycle of operation.

2. A low voltage converter comprising:
a source of direct current;
a saturable core transformer having a primary input winding, a secondary output winding, and a reset winding;
a first switching means for connecting said source of direct current to said input winding, during a first time interval, said first interval ending with the saturation of said core in one direction by the current from said source through said input winding;
an output load;
a storage capacitor connected across said output load;
rectifying means connecting said output winding to said output load; and
a second switching means for connecting said storage capacitor to said reset winding during a second time interval substantially shorter than said first time interval, said second interval ending with the saturation of said core in the other direction by the current from said storage capacitor through said reset winding,
said first and second time interval comprising one cycle of operation.

3. In a low voltage converter as in claim 2 said source of direct current comprising a thermionic diode.

4. In a low voltage converter as in claim 2 said rectifying means comprising a fast-switching, silicon diode.

5. In a low voltage converter as in claim 2 said rectifying means comprising a driven transistor.

6. In a low voltage converter as in claim 2
said transformer having a first control winding connected to said first switching means to turn it on at the start of said first interval and turn if off at the end of said first interval;
and a second control winding connected to said switching means to turn it on at the end of said first interval, which is the start of said second interval, and turn it off at the end of said second interval, which is the start of said first interval.

7. In a low voltage converter as in claim 6 said first switching means comprising a first transistor having a control circuit connected to said first control winding, and an output circuit connecting said source of direct current to said input winding; and said second switching means comprising a second transistor having a control circuit connected to said second control winding, and an output circuit connecting said storage capacitor to said reset winding.

8. In a low voltage converter as in claim 7 said rectifying means comprising a third transistor having a control circuit and an output circuit;

said transformer having a third control winding connected to said control circuit of said third transistor; and said output circuit of said third transistor connecting said output winding of said transformer to said output load.

References Cited by the Examiner

FOREIGN PATENTS 1,030,878  8/1958  Germany.

OTHER REFERENCES

IBM Technical Disclosure Bulletin: "High Voltage Supply," vol. 5, No. 5, October, 1962, pp. 62, 63.

JOHN F. COUCH, *Primary Examiner.*

W. H. BEHA, JR., *Assistant Examiner.*